April 7, 1953          O. BOYER          2,633,851
CLOVER HULLING AND CLEANING ATTACHMENT FOR COMBINES
Filed June 7, 1946          2 SHEETS—SHEET 1

INVENTOR.
Oliver Boyer

April 7, 1953     O. BOYER     2,633,851
CLOVER HULLING AND CLEANING ATTACHMENT FOR COMBINES
Filed June 7, 1946     2 SHEETS—SHEET 2

INVENTOR.
Oliver Boyer
BY
Philip P. Liggins
atty.

Patented Apr. 7, 1953

2,633,851

UNITED STATES PATENT OFFICE 2,633,851

CLOVER HULLING AND CLEANING ATTACHMENT FOR COMBINES

Oliver Boyer, Spencerville, Ohio, assignor of one-fourth to Philip E. Siggers, Sr., Wilmington, Del.

Application June 7, 1946, Serial No. 675,047

3 Claims. (Cl. 130—2)

1

This invention relates to attachments for combines and its general object is to provide an attachment which will save much of the clover seed now wasted by commercial combines. The invention is also useful for saving alfalfa seed.

Objects are to provide an attachment for combines which is fully automatic, is adjustable to different conditions, is easily assembled upon and removed from the combine by one man, and prevents clogging of the combine by being overloaded with litter and clover seed.

Another object is to provide an attachment for combines which collects the ragweed seed so that the latter may subsequently be destroyed. A further object is to provide a combine attachment which necessitates practically no alteration in the combine itself in order to be installed and operate satisfactorily. Another object is to provide a combine attachment which will deliver very clean seed free from ragweed seed.

Referring to the accompanying drawings showing a preferred embodiment of the invention—

Figure 5:
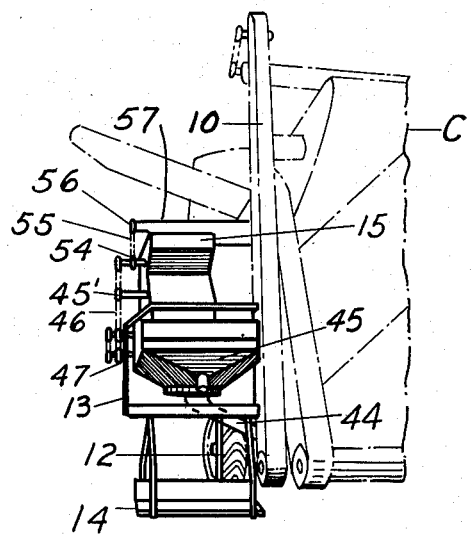
Fig. 5 is a side elevation of the attachment shown at the side of a Massey-Harris combine, the latter being indicated in dot and dash lines and only so much being shown as to enable those familiar with such machines to properly mount my attachment.

Referring particularly to the drawings, the Massey-Harris combine is generally designated by the letter C (Fig. 5) and may be considered as either a 7 ft. or a 12 ft. combine, since my attachment has been successively used with both models. My attachment is located on the side of the combine adjacent the seed elevator 10, and it is driven by a belt 11ª direct from the combine power shaft 11 (Fig. 1) which is a transverse shaft near the bottom of the combine and about midway between its front and rear ends. The combine is self-propelled and one of its rubber-tired rear wheels by which it is driven is indicated at 12.

2

Figure 1:
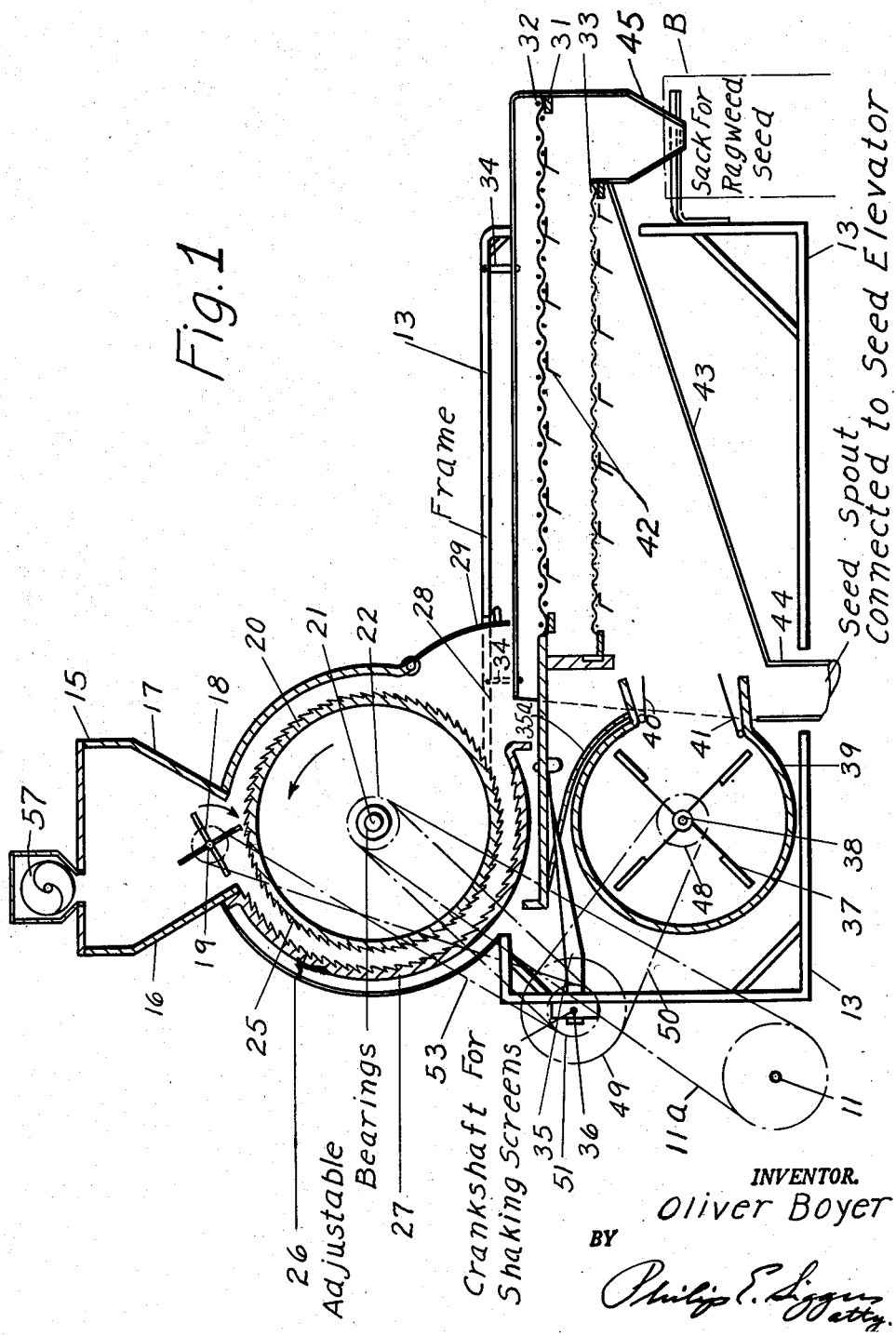
Fig. 1 is a somewhat diagrammatic sectional elevation of the attachment.

Now referring to Fig. 1, the attachment consists of a rigid frame 13 of angle iron or the like which supports the attachment at the side of the combine and permits it to be removed as a unit. Only part of this frame is shown, but in general it may be said that the frame is open though it encloses the attachment except at the top, where the litter is received for processing, and at the spout end where the ragweed seed is delivered to a bag B. A platform 14 (Fig. 5) is preferably rigidly secured to the frame 13 to provide a support for the bag B (Fig. 1) which collects the ragweed seed. If desired, an operator or attendant may stand on the platform 14 while the machine is in operation or while it is temporarily stopped to permit removal of one full bag and the attachment of an empty bag. The usual bag-holding device (not shown) will secure the ragweed seed bag to the delivery spout of the attachment so that none of the ragweed seed may be scattered on the ground.

The attachment further includes a hopper 15 closed at the top which receives litter, bits of straw and unhulled clover seed direct from the combine. In other words, all the clover seed (or alfalfa seed) which the combine would normally process is diverted to my attachment. The hopper 15, which is at the upper end of the attachment, has downwardly converging bottom walls 16, 17 and between said walls adjacent the delivery end of the hopper is a beater 18, which is merely a power-rotated feed device consisting of about four radial vanes or arms rigidly fixed to a shaft 19. The beater 18 prevents choking as it forces the material in the hopper down through the constricted throat or delivery end of the hopper and against the rotary cylinder 20, where the seed is hulled. The cylinder 20 comprises a metal, cylindrical, hollow shell mounted on a shaft 21 which has adjustable bearings (not shown) and is driven by a pulley 22 on the inner or combine end, said pulley deriving its power from belt 11ª. The outer surface of the cylindrical shell 20 is completely covered with staggered rows of rasp teeth 25, each about $\frac{3}{8}$ in. tall and all pointed in one direction, which is more or less tangential to the outer surface of the cylinder. The points of these rasp teeth are fairly sharp and are but slightly spaced from the similar teeth 26 on a so-called concave 27. Fig. 1 exaggerates the spacing between these parts. The concave is a semi-cylindrical or concave stationary toothed member cooperating with the rotating toothed cylinder to loosen and remove hulls from the clover or alfalfa seed. It will be noted that the stationary teeth 26 are directed oppositely to the direction in which teeth 25 point. This is apparently essential, as is also some provision (such as adjustable shaft bearings) for varying the spacing between the sets of teeth. Fig. 1 shows these rasp teeth diagrammatically, as the teeth per se are old and the parts which carry the teeth are articles of commerce. The hulled seed, with all the litter and debris of the operation, is delivered through the throat 28 to a shaking screen to be described, and directly adjacent this throat is a hinged door 29 whose lower end may be raised at any time by the operator, or partly raised if desired, and held in adjusted position by a lever arm (not shown) passing over a notched quadrant, or by some similar mechanical expedient. In the event the feed is choked by an excessive volume of litter, the hinged door 29 will be found very convenient.

Figure 2:
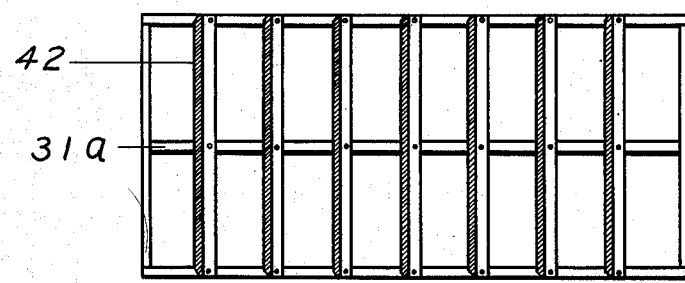
Fig. 2 is a bottom plan view of one of the sieves or shaker screens.
Figure 3:
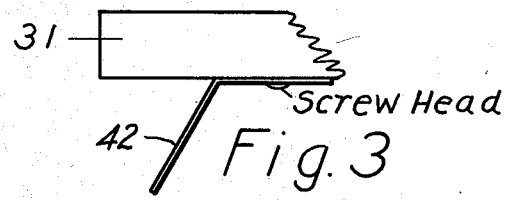
Fig. 3 is a detail in side elevation, showing one of the blast-modifying fins of the sieve or screen of Fig. 2 on approximately full size scale.
Figure 4:
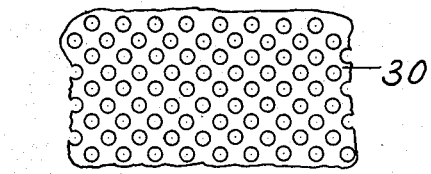
Fig. 4 is a fragmentary detail in plan of one of the screen cloths.

The shaking screen according to my experience must be a double screen, with a coarse screen above and a fine screen below. Except for the sizes of the holes, both screens are similar in construction, each consisting of perforated sheet metal 30 (Fig. 4) fixed as by screws or the like to the top of a rectangular frame 31, which may be of wood or metal, having a central rib 31ª (Fig. 2) extending from end to end, to which the perforated sheet should also be attached. The upper screen 32 is fine enough to catch all the litter but it is coarse enough to permit all the ragweed seed and clover or alfalfa seed to pass through. The fine screen 33 is directly below and parallel to the coarse screen or sieve, and its perforations are such that the ragweed seed cannot pass through but the clover seed (or alfalfa seed) can. Both screens or sieves 32, 33 are rigidly secured together (though separately removable at will as for cleaning) and both are supported by a parallel motion linkage consisting of at least four parallel links 34 (two on each side), the upper ends of said links being pivotally mounted on a horizontal part of the rigid frame 13 and the lower ends of the links being pivotally secured to the upper screen 32. A pair of arms 35 are each fixed at one end to a riddle shoe 35ª and at the other end each arm is supported upon a power-operated crankshaft 36 with an off-center connection to arm 35 to give a small throw, say about ⅛ or ¼ in., during each revolution of the crankshaft. The riddle shoe 35ª is a smooth piece of sheet iron which fits around and is slightly spaced from the blower housing 39. The screens and riddle shoe vibrate or shake as a unit. The construction and action will be readily understood without detailed illustration. Thus during operation of the attachment the two screens are shaken rapidly back and forth, which prevents clogging and helps to secure the separation of the different kinds of seed which is essential for successful operation of the machine. The trash and litter are partly blown off and partly shaken off the top or coarse screen 32 and fall to the ground as the combine travels in the field.

Directly below the cylinder and below the level of the upper screen 32 is a blower 37 mounted on a power-driven shaft 38. Air is drawn in from one end of the blower housing 39 and is blown out past vanes 40, 41 which are separately adjustable to vary the direction of the blast. Arms or levers movable over quadrants (not shown), or similar mechanical expedients, permit the operator to adjust the positions of the vanes and thus direct the air toward the areas of the screens which seem to have a tendency to clog, under the conditions in the field. The blast is further modified by fixed transverse fins 42 which are on the bottom of each screen and extend at angles of about 45° to the general planes of the respective screens. These fins 42 may be of bendable metal to permit varying their angles or their angles may be adjusted by means of shims (not shown) or in other ways. These fins catch the blast and direct it up through the perforations of the screens. The combined action of the directed blast and the shaking screens positively prevents clogging of the screens, yet permits the essential separation of the seeds described above.

Directly below the fine screen 33 is an inclined slide or apron 43 down which the clean clover seed or alfalfa seed slides until it reaches the seed spout 44. The seed in the seed spout simply gravitates toward the combine, and is delivered to the seed elevator 10, by which it is carried up to the seed bin at the top of the combine.

The ragweed seed, as already mentioned, cannot pass through the lower screen and hence is moved along by the combined action of the blast and the shaking until it reaches a spout 45, where it falls into the bag or sack B. I consider this removal of the ragweed seed as essential in a device of this character.

Figure 6:
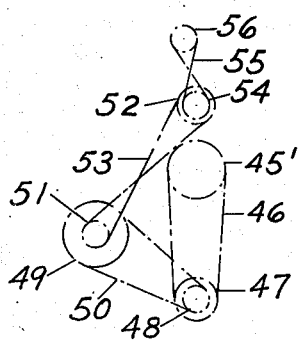
Fig. 6 is a diagrammatic view showing the relative relation of certain of the driving belts and pulleys with which the attachment is actuated from the power mechanism of the combine.

The drive and operation of the various parts may be understood from the following description. Belts 11ª is driven by the power shaft 11 of the combine and drives a pulley on the shaft 21 of the cylinder, on the end next to the combine. On the opposite end (the left end as the parts are viewed in Fig. 5) shaft 21 carries another pulley 45' (Figs. 5 and 6) over which a belt 46 is trained. Belt 46 drives the blower 37 through its shaft 38 and a smaller pulley 47; hence the blower rotates at a higher speed than the cylinder. A small pulley 48 on the blower shaft 38 drives a large pulley 49 on the crankshaft 36 by means of a belt 50, so that the crankshaft has a much slower rotation than the blower. A small pulley 51 also on the crankshaft drives a large pulley 52 by means of a belt 53, and pulley 52 drives the shaft 19 of the beater. Finally, a pulley 54 on the beater shaft and a crossed belt 55 drive a pulley 56 to operate a conveyor 57 which delivers the litter and unhulled seed from the combine to the hopper 15.

By actual tests, the described attachment will save one-fourth of the clover seed wasted by a commercial combine. I have obtained 140 bushels of clean clover seed off of 35 acres, with the aid of the described attachment. When working with alfalfa seed, which grinds up much more easily than clover seed, the cylinder is necessarily adjusted differently. My attachment will save up to 50% of alfalfa seed as compared with the yield of a commercial combine. Probably the attachment may be used successfully when working with other seeds, and I do not wish to be limited to clover and alfalfa seeds. I seek protection in the appended claims commensurate with the importance of the invention.

What I claim is:

1. The combination with a combine having power means for driving the mechanism thereof and having at one side thereof conveying means for delivering unhulled seed and litter from the combine, and seed elevating means; of a detachable clover and alfalfa seed threshing unit including an inlet hopper for receiving unhulled seed and litter from the combine, means for separating and cleaning the seed, a spout for discharging clean seed from the thresher, and means, comprising an open frame detachably secured at the side of the combine on which unhulled seed delivering means and clean seed elevating mechanism are located, for supporting the thresher with its inlet hopper in receiving relation to the unhulled seed delivering mechanism of the combine, and with its discharge spout in operative relation to the seed elevating mechanism of the combine, and means operatively connected to the power means of the combine for driving the separating and cleaning mechanism of the thresher unit.

2. The invention claimed in claim 1, wherein the means for separating and cleaning the seed comprises a rotary seed-hulling cylinder, a concave stationary toothed member co-operating with the rotary cylinder to loosen and remove hulls from the seed, a shaking screen so positioned as to receive all the seed and litter and debris from the cooperating cylinder and concavo, a blower directing a blast of air up through said screen, the litter and debris being partly blown off and partly shaken off the upper part of the screen and falling to the ground as the combine travels in a field, and means for collecting ragweed seed from the discharge end of the screen.

3. The invention claimed in claim 1, wherein the means for separating and cleaning the seed comprises a seed-hulling mechanism below the inlet hopper, a shaking screen so positioned as to receive all the seed and litter and debris from said seed-hulling mechanism, a blower, means directing the blast of air from the blower up through said screen, the litter and debris being partly blown off and partly shaken off the upper part of the screen and falling to the ground as the combine travels in a field, the seed gravitating to said spout in a path below the blast of air, and means for collecting ragweed seed from the discharge end of the screen.

OLIVER BOYER.

REFERENCES CITED

The following references are of record in the file of this patent:

UNITED STATES PATENTS

| Number | Name | Date |
| --- | --- | --- |
| 182,318 | Lippy et al. | Sept. 19, 1876 |
| 393,613 | Burfeind | Nov. 27, 1888 |
| 418,430 | Wetsell | Dec. 31, 1889 |
| 633,923 | Sutton | Sept. 26, 1899 |
| 688,823 | Bowers | Dec. 17, 1901 |
| 710,981 | Jessep | Oct. 14, 1902 |
| 997,641 | Thomson | July 11, 1911 |
| 1,126,288 | Rumely et al. | Jan. 26, 1915 |
| 1,651,641 | Spurr | Dec. 6, 1927 |
| 1,730,690 | Sawin | Oct. 8, 1929 |
| 1,793,385 | Boyer | Feb. 17, 1931 |